(12) United States Patent
Hsu

(10) Patent No.: US 7,550,892 B2
(45) Date of Patent: Jun. 23, 2009

(54) HIGH SLOT UTILIZATION SYSTEMS FOR ELECTRIC MACHINES

(75) Inventor: John S Hsu, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 11/463,970

(22) Filed: Aug. 11, 2006

(65) Prior Publication Data

US 2007/0075604 A1 Apr. 5, 2007

Related U.S. Application Data

(60) Provisional application No. 60/596,541, filed on Oct. 3, 2005.

(51) Int. Cl.
*H02K 1/16* (2006.01)
*H02K 1/18* (2006.01)

(52) U.S. Cl. .................. 310/218; 310/259; 310/180

(58) Field of Classification Search .......... 310/259, 310/258, 218, 216, 179, 180
See application file for complete search history.

(56) References Cited

U.S. PATENT DOCUMENTS

| 3,188,505 A | * | 6/1965 | Wiley ........................ 310/259 |
| 3,441,760 A | * | 4/1969 | Collens ...................... 310/91 |
| 3,613,227 A | * | 10/1971 | Parker ........................ 29/596 |
| 4,241,274 A | * | 12/1980 | Brammerlo ................ 310/259 |
| 5,233,252 A | * | 8/1993 | Denk ......................... 310/254 |
| 5,708,316 A | * | 1/1998 | Ishida ........................ 310/184 |
| 6,201,322 B1 | * | 3/2001 | Heine et al. ................. 310/51 |
| 6,940,198 B2 | | 9/2005 | Ionel et al. |
| 6,940,202 B1 | | 9/2005 | Chen et al. |
| 7,246,428 B2 | * | 7/2007 | Fukasaku et al. .............. 29/605 |
| 2004/0189136 A1 | * | 9/2004 | Kolomeitsev et al. ........ 310/218 |
| 2005/0110357 A1 | * | 5/2005 | Fukasaku et al. ............ 310/179 |
| 2006/0028087 A1 | * | 2/2006 | Ionel et al. .................. 310/218 |
| 2007/0075604 A1 | * | 4/2007 | Hsu .......................... 310/214 |

FOREIGN PATENT DOCUMENTS

| JP | 05056592 | * | 3/1993 |
| JP | 05284677 | * | 10/1993 |
| JP | 10309048 | * | 11/1998 |
| JP | 2001157392 | * | 6/2001 |
| JP | 2001218439 | * | 8/2001 |

* cited by examiner

*Primary Examiner*—Karl I Tamai
(74) *Attorney, Agent, or Firm*—Brinks Hofer Gilson & Lione

(57) ABSTRACT

Two new High Slot Utilization (HSU) Systems for electric machines enable the use of form wound coils that have the highest fill factor and the best use of magnetic materials. The epoxy/resin/curing treatment ensures the mechanical strength of the assembly of teeth, core, and coils. In addition, the first HSU system allows the coil layers to be moved inside the slots for the assembly purpose. The second system uses the slided-in teeth instead of the plugged-in teeth. The power density of the electric machine that uses either system can reach its highest limit.

8 Claims, 8 Drawing Sheets

HIGH SLOT UTILIZATION SYSTEMS FOR ELECTRIC MACHINES

CROSS-REFERENCE TO RELATED APPLICATIONS

This application claims priority to U.S. Provisional Patent Application 60/596,541 filed Oct. 3, 2005, and is herein incorporated by reference.

STATEMENT REGARDING FEDERALLY SPONSORED RESEARCH

This invention was made with United States Government support under Contract No. DE-AC05-00OR22725 between the United States Department of Energy and U.T. Battelle, LLC. The United States Government has certain rights in this invention.

BACKGROUND OF THE INVENTION

Preformed coils offer the highest numbers of wires that can be packed inside a slot. The commonly known "form wound" coils refer to the coils with their conductors arranged in a rectangulae-shape for a rectangular coil layer. The coil layer is put into a rectangular slot in the stator core. The problem associated with the traditional form wound electric machine is that a rectangular slot may not be the best design. In fact, most of the small and medium size electric machines generally use a non-rectangular slot to obtain the best magnetic design of the stator punching. This results in the shape of a coil layer to be bigger at the bottom of a slot (lower layer) and smaller at the top of a slot (upper layer). The existing technology cannot put a form wound coil of this non-rectangular layers into a slot of a stator lamination stack with many distributed slots, because the big lower layer of the coil cannot go through the small opening of the slot. Therefore, only the relatively low fill-factor mush-wound coils are used. This invention overcomes the problems associated with the low fill-factor and preserves the performance advantages of an electric machine having a distributed-winding in the non-rectangular slots.

This new technology is not associated with the preformed concentric-wound coils that are used for the compressed powder poles of some electric machines that have less attractive performance than that of the electric machines with distributed windings and slots.

BRIEF SUMMARY OF THE INVENTION

Two new High Slot Utilization (HSU) Systems for electric machines are introduced. Both systems enable the use of form wound coils that have the highest fill factor and the best use of magnetic materials. The epoxy/resin/curing treatment ensures the mechanical strength of the assembly of teeth, core, and coils. In addition, the first HSU system allows the coil layers to be moved inside the slots for the assembly purpose. After the coils are properly located, the plugged-in teeth are inserted into the space between the coil layers. Various methods can be used to secure the plugged-in teeth. The second system uses the slided-in teeth instead of the plugged-in teeth. The form wound coils are put into the slots by entering the bottom of slots.

The power density of the electric machine that uses either system can reach to its highest limit. The productivity can be increased because the preformed coils can simply be put together without going through the very small slot openings.

DETAILED DESCRIPTION OF THE INVENTION

Figure 1:
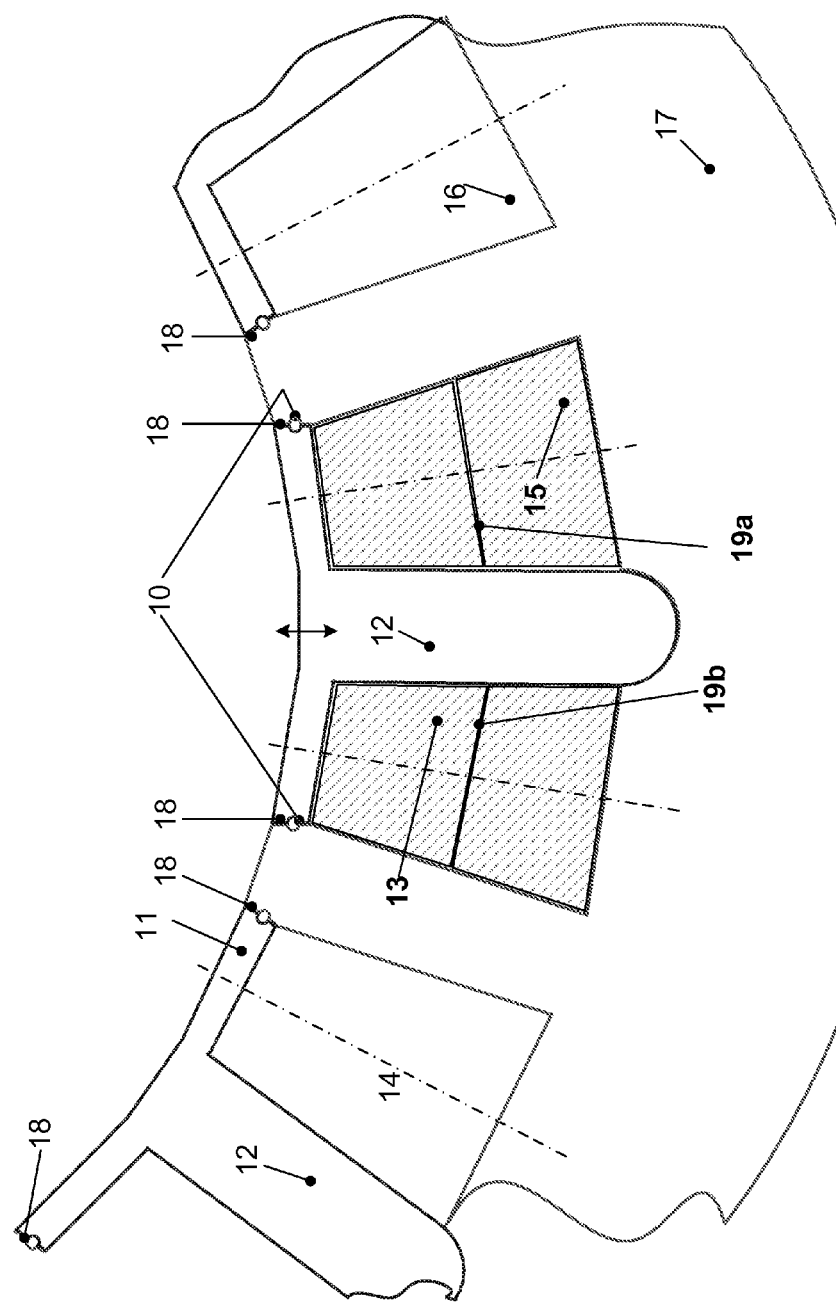
FIG. 1 is a diagram of a High Slot Utilization (HSU) system.

The First High Slot Utilization (HSU) System, as shown in FIG. 1, explains the first HSU system through an example of this invention. Each slot 16 of the stator punching 17 accommodates a first preformed wound coil 19a and second preformed wound coil 19b, each first and second coil having and upper layer 13 and a lower layer 15. These layers of coils are preformed before putting into the slots. A highest fill factor can be achieved due to the nature of preformed coils 14. FIG. 1 shows that every other tooth is a plugged-in tooth 12. When the plugged-in tooth 12 is absent, the large opening enables the coils' entering the slots and moving inside the slot. This feature will be shown further in the additional figures. The circular bottom of the plugged-in tooth 12 provides a larger interfacing area for the magnetic flux to go between the tooth and the stator core. The top of the plugged-in tooth consists of two magnetically saturable extensions 11 that can limit the slot leakage flux going through these two extensions. The interfacing surfaces 18 to the teeth of the stator punching are in parallel to the plugged-in tooth to allow the insertion of the tooth to the stator punching. The interfacing distance and the height of the magnetically saturable extensions 11 can be controlled to determine the leakage reactance. Epoxy is applied to both interfacing surfaces 18 before plugging-in the tooth. Short tapered pins 10 are inserted sideways into the small holes of the interface from each end of the stator stack to hold the tooth in position for curing. Excessive epoxy in the stator bore has to be wiped off to prevent any interference in the air gap. An epoxy or resin treatment for the assembly is needed to ensure the mechanical strength and rigidity of the assembly consisting of the plugged-in teeth, coils, and stator punching stack.

Figure 2:
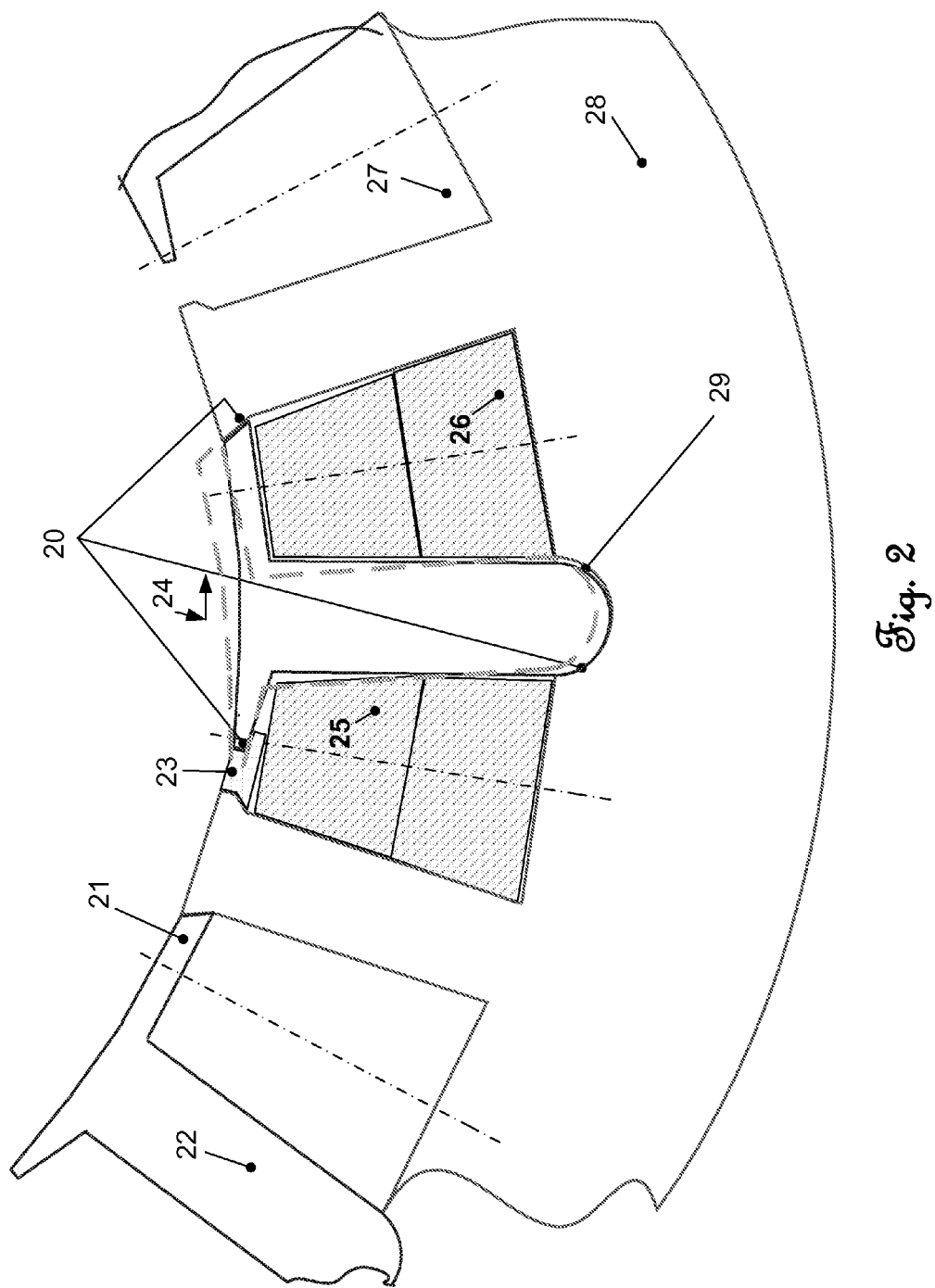
FIG. 2 is a diagram of another High Slot Utilization (HSU) system.

FIG. 2 shows another example of the first HSU system. Instead of the straight in and out of the plugged-in tooth shown in FIG. 1, a tooth in FIG. 2 needs to be tilted a little as shown by the dotted line for entering the slot. A wedge 23 is used to lock the tooth in its proper position shown in the solid line. Each slot 27 of the stator punching 28 accommodates an upper layer 25 of coil and a lower layer 26 of coil. These layers of coils are preformed before putting into the slots. A highest fill factor can be achieved due to the nature of preformed coils. FIG. 2 shows that every other tooth is a plugged-in tooth 22. When the plugged-in tooth 22 is absent, the large opening enables the coils' entering the slots and moving inside the slot. This feature will be shown further in the additional figures. The circular bottom of the plugged-in tooth 22 provides a larger interfacing area for the magnetic flux to go between the tooth and the stator core. The top of the plugged-in tooth consists of two magnetically saturable extensions 21 that can limit the slot leakage flux going through these two extensions. Epoxy is applied to the tooth interlocking interfaces 20. An asymmetrical joint gap 29 is formed where tooth rocking clearance was required for installation. Again, epoxy or resin treatment is needed to ensure the mechanical rigidity and strength of the assembly.

Figure 3:
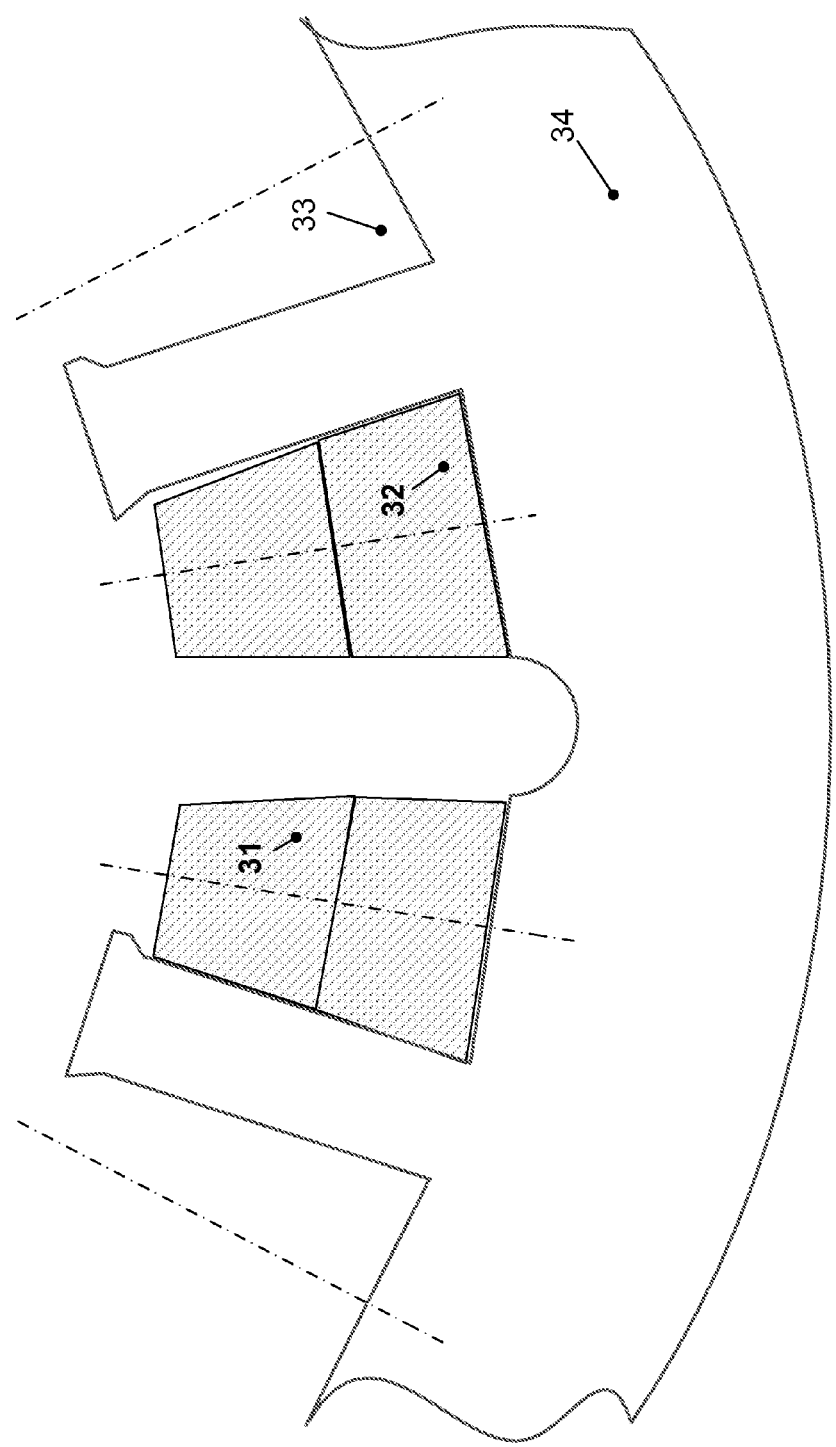
FIG. 3 is a diagram of another High Slot Utilization (HSU) system before plugging in teeth.

FIG. 3 shows an example of the ample rooms available in the slots of a HSU system before plugging in the tooth.

Figure 4:
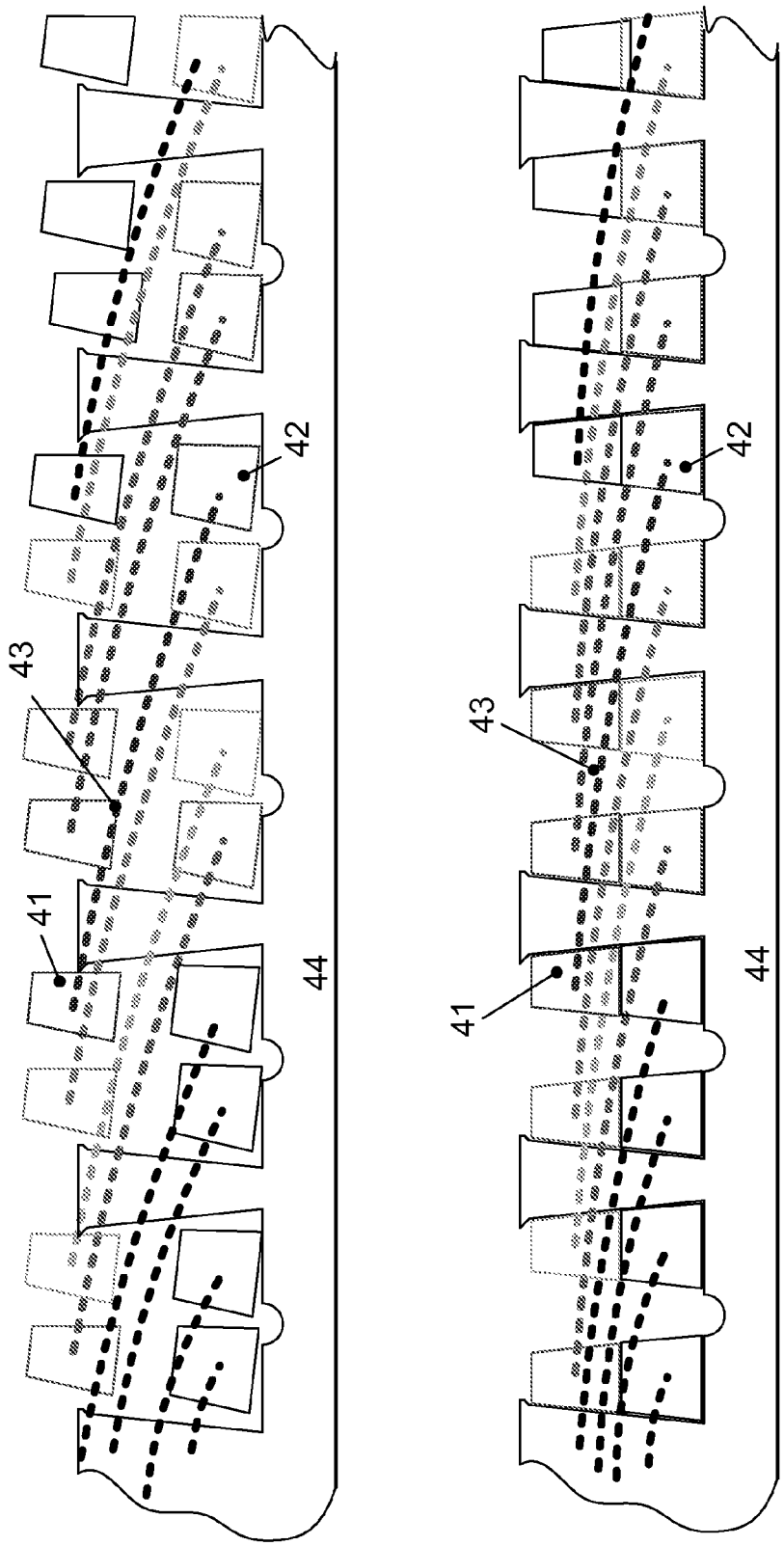
FIG. 4 is a linearized view showing the coil layers can be moved inside slots while positioning coils.

FIG. 4 is a linearized view showing that upper layer 41 of coil and a lower layer 42 of the coil can enter and move inside stator core 44 slots while the preformed coils are being properly positioned. End turns 43 are shown as dotted lines.

Figure 5:
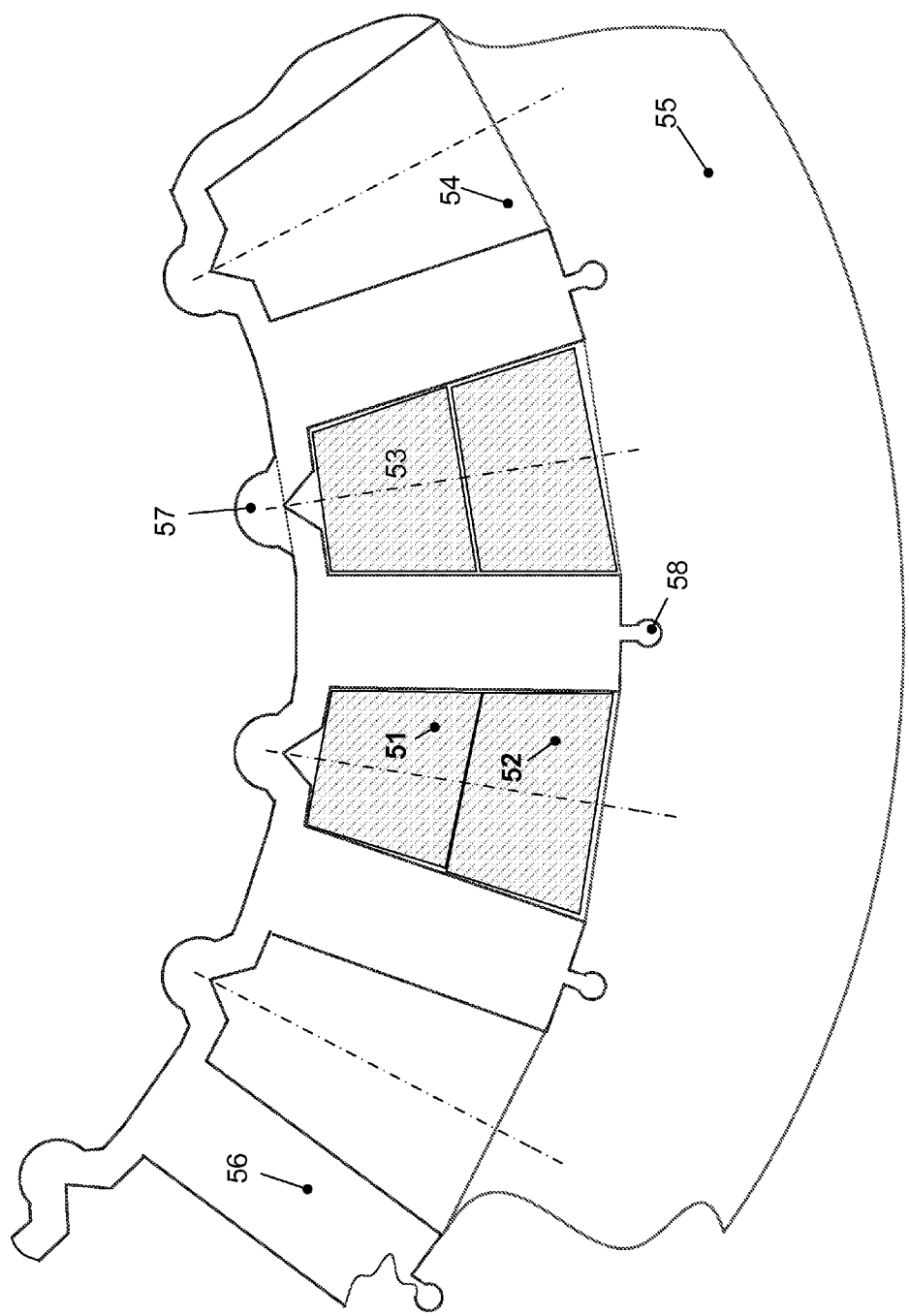
FIG. 5 is a diagram of another embodiment of High Slot Utilization (HSU) system.
Figure 6:
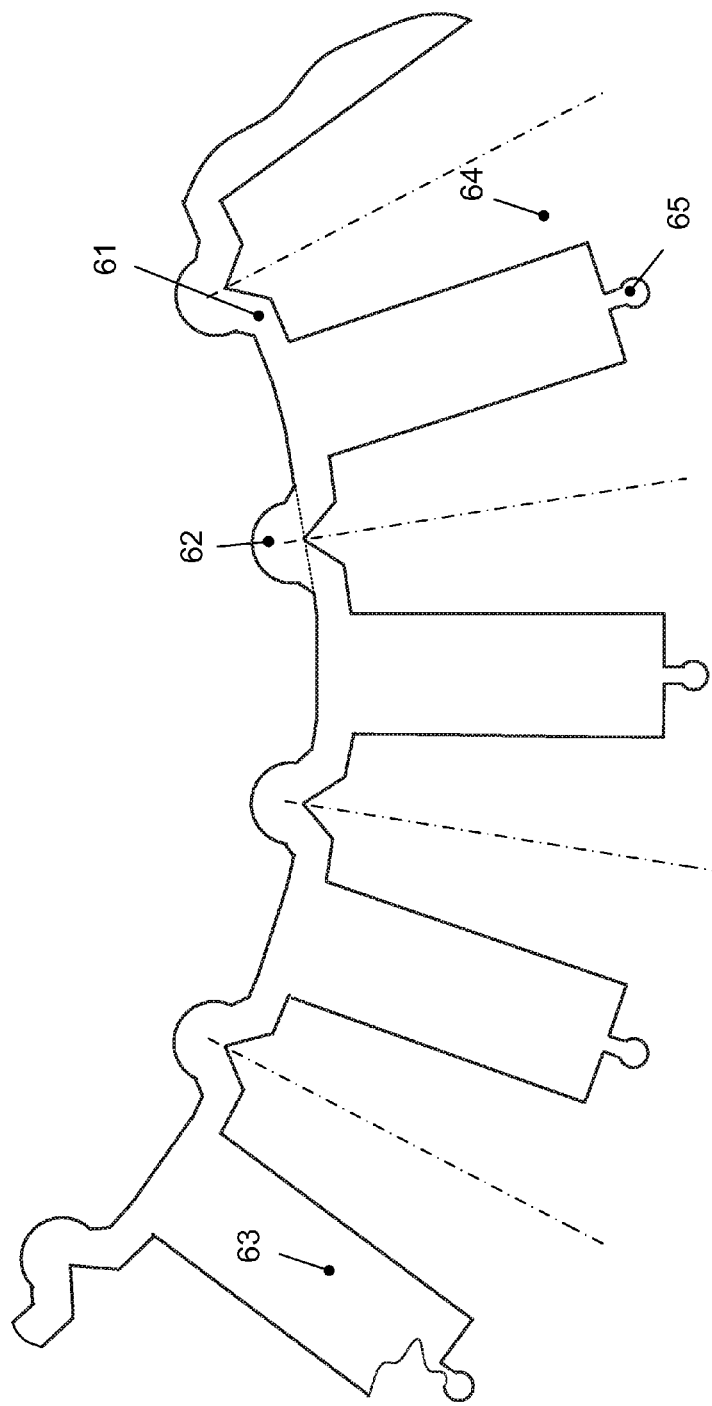
FIG. 6 is a diagram of a stack of slided-in teeth of the $2^{nd}$ embodiment HSU system.
Figure 7:
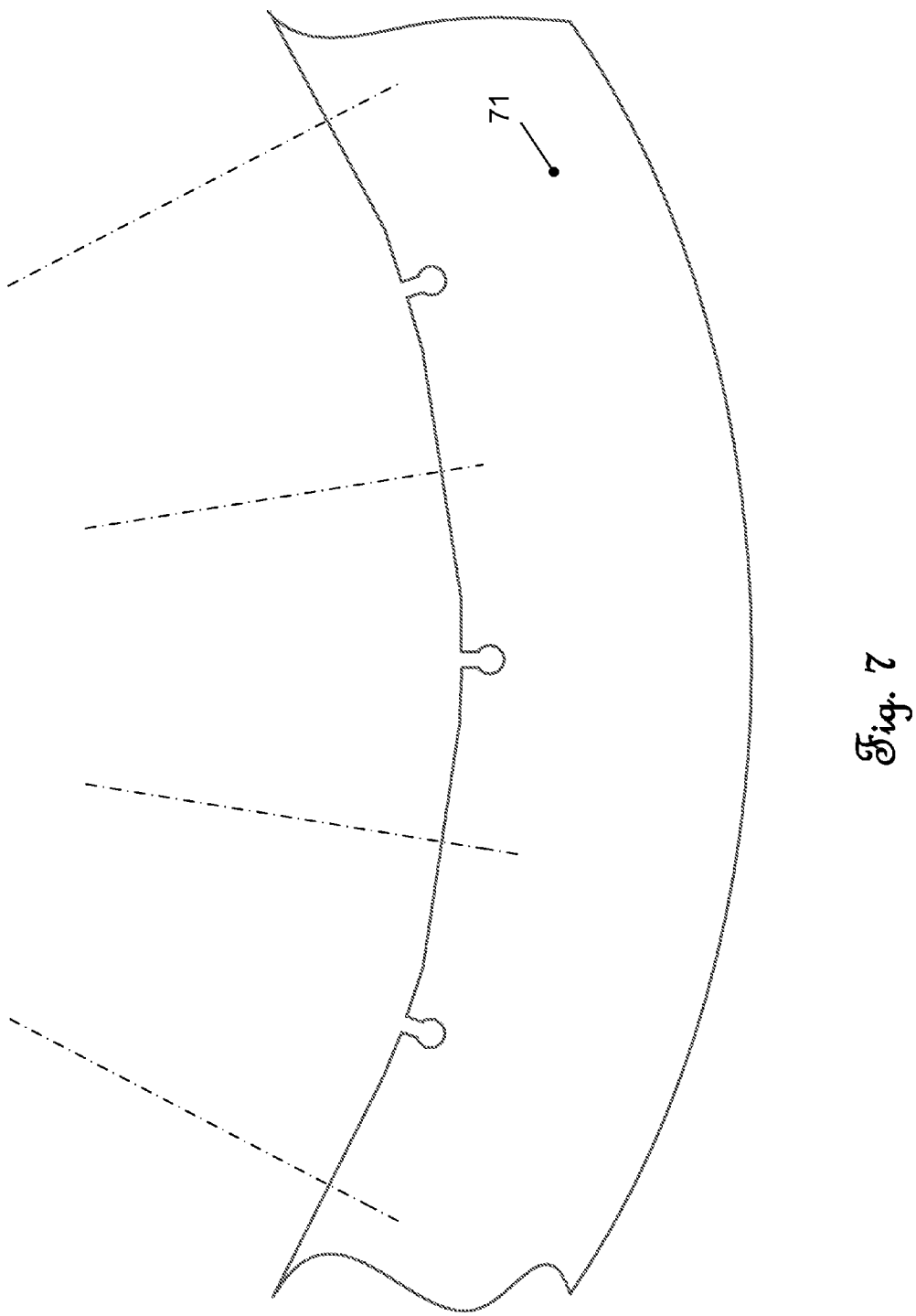
FIG. 7 is a diagram of a stator core stack on the $2^{nd}$ embodiment HSU system.

The Second High Slot Utilization (HSU) System: FIG. 5 shows an example of the 2nd high slot utilization system. A stack of slided-in teeth 56, as shown in FIG. 6, and a stator-core stack 55, as shown in FIG. 7, are used. Unlike the conventional electric machines whose coils are inserted into the slots 54 from the small slot openings, this system puts the coils 53 into the slots through the big inverse openings of the slots. The upper layer 51 and a lower layer 52 of the preformed coil layers can enter the slots without difficulty. A certain elastic property of the end turns of the coils may be required due to the fact that the diameter at the inverse openings of the slots is larger than the diameter of which the coil layers are located. This elastic property of the end turns does not affect the preformed shapes of the layers.

The holding-on portions 57 and 62 of the slided-in teeth 56 shown in FIGS. 5 and 6 are used for holding the teeth in their proper locations. The teeth stack 61 is clamped together on a cylindrical mandrel before putting the coils into the slots 54 and 64. The teeth stack 61 is then slid into the stator core stack 55 through the coupling of the locking tails 58 and 65. The holding-on portions 57 and 62 will have to be taken off after the assembly going through the Epoxy/Resin/Coring treatment to ensure a small slot flux leakage path and to have a final stator bore with a proper diameter and roundness. The required height of the holding-on portion 57 and 62 depends on the needed mechanical strength for holding the slided-in teeth together. A minimal height that can do the holding-on job is most desirable.

Figure 8:
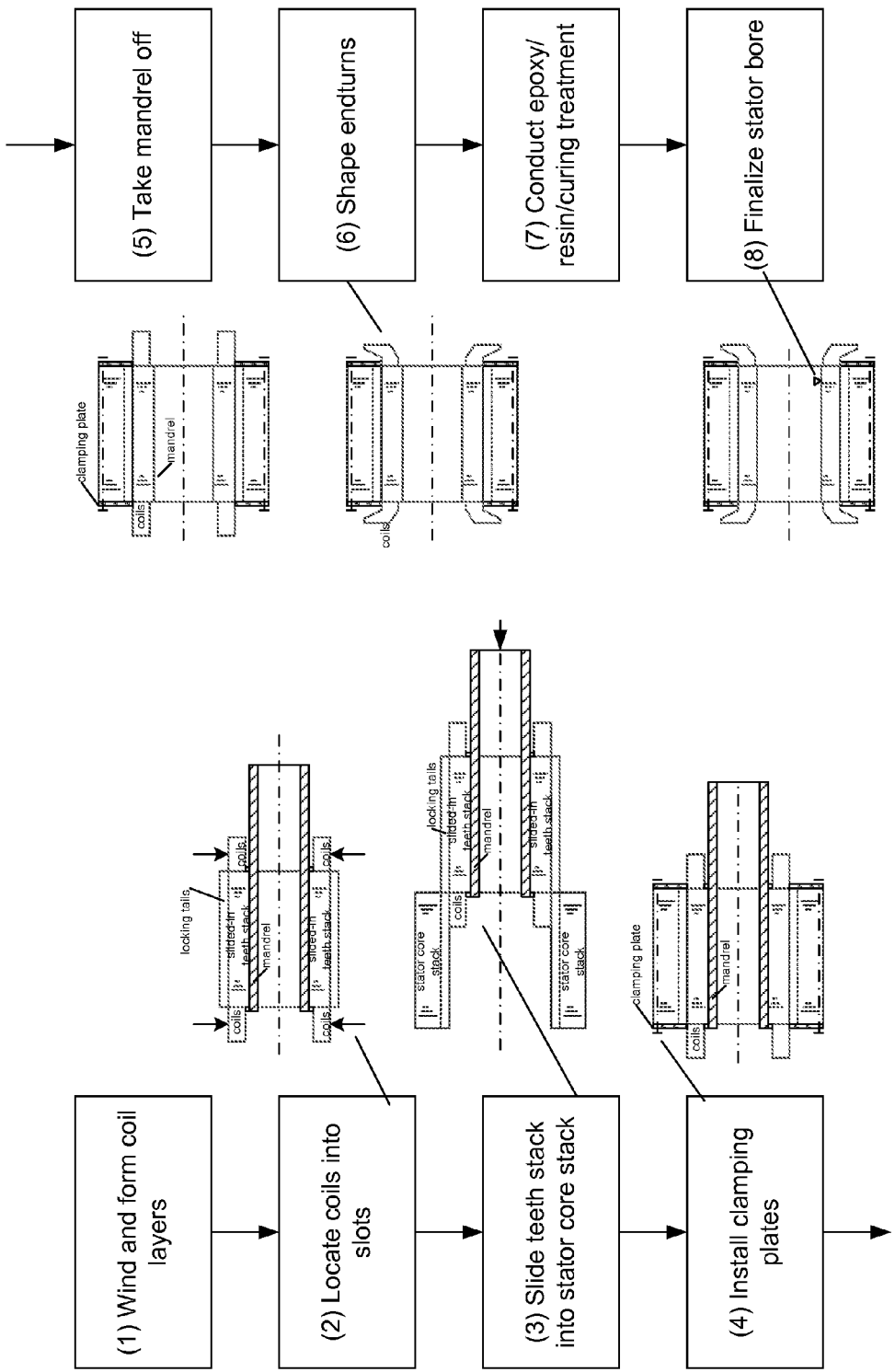
FIG. 8 is a diagram of the process steps for the $2^{nd}$ HSU system.

FIG. 8 shows the process steps in making the $2^{nd}$ HSU system.

Some unique features of the invention are; high slot fill, reduction of winding labor, and better machine performance. The invention is used for both motors and generators and can be applied to axial-gap machines.

While there has been shown and described what are at present considered the preferred embodiments of the invention, it will be obvious to those skilled in the art that various changes and modifications can be made therein without departing from the scope.

I claim:

1. A stator comprising;
a generally cylindrically-shaped stator punching having a plurality of circumferentially spaced and axially-extending non-rectangular slots in a surface thereof, said slots extending between an upper and a lower end of said stator punching and said slots comprising an interfacing surface on each side of the slot;
a plurality of first and second preformed wound coils disposed in said slots as distributed windings having a coil span greater than 1, said coils further comprising an upper layer disposed in one of said slots adjacent said upper end of said stator punching and a lower layer disposed in said one of said slots adjacent said lower end of said stator punching;
a plurality of plugged-in teeth, each of which are disposed centrally in one of said slots adjacent said upper layer and lower layer interposed between said first and second preformed wound coils, said teeth further comprising magnetically saturable extensions disposed proximate said upper end and extending outward to the interfacing surface of said one of said slots in said stator punching, wherein each of the teeth comprises two extensions for limiting a slot leakage flux.

2. The stator according to claim 1 wherein said plugged in teeth have a circular bottom.

3. The stator according to claim 1 wherein the coupling between said teeth and said stator punching is controlled to determine leakage reactance.

4. The stator according to claim 1 wherein epoxy is used to couple said teeth and said stator punching.

5. The stator according to claim 1 wherein short tapered pins hold said teeth in place for curing.

6. The stator according to claim 1 further comprising a final treatment selected from the group consisting of epoxy and resin.

7. The stator according to claim 1 further comprising a wedge disposed in each said slot proximate said upper end of said stator punching, wherein the wedge extends from the interfacing surface of the slot.

8. A stator comprising;
a generally cylindrically-shaped stator punching comprising a plurality of non-rectangular slots that extend axially from a lower end of the stator punching to an upper end of the stator punching, wherein each of the slots comprises an interfacing surface on either side of the slot;
a plurality of cylindrically-shaped slided-in teeth that correspond with the plurality of slots, wherein each of the teeth are disposed in one of the slots and extends from the upper end of the stator punching to the lower end of the stator punching, further wherein each of the teeth comprise magnetically saturable extensions disposed adjacent the upper end and extending outward to the interfacing surface of the slot, wherein each of the teeth comprises two extensions for limiting a slot leakage flux; and
a plurality of preformed wound coils disposed in said slots as distributed windings having a coil span greater than 1, said coils further comprising an upper layer disposed proximate the upper end and a lower layer disposed proximate lower end.

\* \* \* \* \*

UNITED STATES PATENT AND TRADEMARK OFFICE
CERTIFICATE OF CORRECTION

| | |
|---|---|
| PATENT NO. | : 7,550,892 B2 |
| APPLICATION NO. | : 11/463970 |
| DATED | : June 23, 2009 |
| INVENTOR(S) | : John S. Hsu |

It is certified that error appears in the above-identified patent and that said Letters Patent is hereby corrected as shown below:

<u>In the Claims</u>

In column 3, claim 1, line 56, immediately after "comprising" replace ";" with --:--.

In column 4, claim 8, line 36, immediately after "comprising" replace ";" with --:--.

Signed and Sealed this

Twenty-seventh Day of October, 2009

David J. Kappos
*Director of the United States Patent and Trademark Office*